United States Patent [19]

Briggs

[11] Patent Number: 4,568,589

[45] Date of Patent: Feb. 4, 1986

[54] PATCH AND METHOD OF REPAIRING DISCONTINUITIES IN WORK SURFACES

[75] Inventor: Paul C. Briggs, Danvers, Mass.

[73] Assignee: Illinois Tool Works Inc., Chicago, Ill.

[21] Appl. No.: 539,455

[22] Filed: Oct. 6, 1983

[51] Int. Cl.[4] .................. B32B 3/26; B32B 35/00; C09J 7/02

[52] U.S. Cl. .................. 428/63; 156/94; 427/140; 428/261; 428/290; 428/343; 428/355; 428/408; 428/474.4

[58] Field of Search .............. 428/63, 40, 343, 261, 428/290, 408, 474.4, 355; 427/140; 156/94

[56] References Cited

U.S. PATENT DOCUMENTS

| | | | |
|---|---|---|---|
| 3,189,509 | 6/1965 | Needham | 428/63 |
| 3,920,497 | 11/1975 | Speer | 427/140 X |
| 4,135,017 | 6/1979 | Hoffmann, Sr. | 428/40 X |
| 4,208,456 | 6/1980 | Holmes | 428/63 |
| 4,237,242 | 12/1980 | Frankel | 428/63 X |

Primary Examiner—Thomas J. Herbert
Attorney, Agent, or Firm—J. R. Halvorsen; T. W. Buckman

[57] ABSTRACT

An improved patch and method of repair of the integrity and/or surface imperfections of a structure which is defective because of accidental damage or flaws during the course of manufacture or subsequent use and handling. The invention relates to the use of a fibrous cloth which is impregnated by a fast curing acrylic-based adhesive composition which is utilized with an activator/accelerator that can be applied to the margins of the faulty workpiece and thence to the overall impregnated cloth to quickly cure it at ambient temperature. The improved material provides good adhesion to a wide variety of materials including unprepared metals, painted metals, plastics and moist or oil contaminated surfaces and displays a high impact strength heretofore not found in such materials.

19 Claims, No Drawings

PATCH AND METHOD OF REPAIRING DISCONTINUITIES IN WORK SURFACES

BACKGROUND OF THE INVENTION

This invention is directed to an improved patch and method of repair of the integrity and/or surface imperfections of fiberglass; sheet metal or plastic structures which are defective because of accidental damage or flaws during the course of manufacture or subsequent use and handling. The techniques and methods are also applicable to the manufacture of new original equipment.

It has been known in the art to patch damaged metal and/or fiberglass reinforced polyester objects with fiberglass cloth which has been saturated with either epoxy or polyester/styrene resin compositions. The resulting composites have many disadvantages such that they generally require that the resins be supplied as two separate components which must be premixed just prior to use. After the mixing has been completed the fiberglass cloth must be saturated with the premixed resin and applied rapidly to prevent premature gelation.

The time frame necessary for cure of such epoxys resins is generally measured in hours and/or overnight. When they have finally cured, the cured composites have relatively poor resistance to impact forces since the cured epoxy and polyester/styrene resins are brittle materials that when impacted can produce severe cracking or total failure.

Epoxies, additionally, require an accurate mix ratio of resin and hardeners and a thorough mixing of both for uniform curing. Polyester/styrene compositions require that a small amount of hardener be mixed thoroughly with the resin, typical ratios being about 5:100 respectively. This provides the potential operator errors leading to poor performance of repaired structures.

Laminate patches are well known. For example, in U.S. Pat. No. 3,189,509 in which an imperforate aluminum beaded sheet utilizes an epoxy resin that is initially fluidal to fill the interstices in a discontinuity of a damaged metal panel as well as the space between the beads on the aluminum sheet. A method of repairing discontinuities in fiberglass structures and utilizing either a polyester resin or the inventor's preferred variety of self-curing epoxy resins is clearly shown in U.S. Pat. No. 3,814,645. A laminate patch for interiors which makes use of aluminum sheeting, paper layers and an overlay of plaster is shown in U.S. Pat. No. 4,135,017. A method for repairing plastic materials in which a backing material is utilized to define a specific void behind the damage and then filling the discontinuity is covered in U.S. Pat. No. 3,920,497. The use of repair patches in automotive tires that utilize a first and second series of strips interwoven at right angles to one another and wherein the strips include reinforcing cords and uncured curable elastomers is shown in U.S. Pat. No. 3,730,247.

SUMMARY OF THE PRESENT INVENTION

The present invention overcomes many of the foregoing problems in repairing damage to the integrity of hollow structures. The present invention also provides a relatively simple means for repairing such structures while maintaining the structure in substantially its original geometry as well as restoring if not improving substantially all of the desirable physical properties to the damaged area.

The present invention provides a flexible substrate such as fiberglass, artificial organic fiber materials (i.e. aramid fiber cloth, etc.) graphite fiber cloth and metallic fiber structures.

These substrates are prepared with modified methacrylate-based resin compositions which impart the following advantages:

1. The resin and activator do not need to be mixed to effect a cure. The fiberglass cloth can be pre-impregnated with the resin and the activator sprayed on the impregnated cloth when hardening is desired.
2. If it is desirable to supply the activator and resin as separate components to be mixed prior to application, such mixing is simpler than required for the epoxy or polyester/styrene compositions. As was mentioned before, the epoxies require accurate mix ratios of resin and hardeners and thoroughly mixing for uniform curing. Similarly polyester/styrene compositions require that a relatively small amount of hardener be mixed thoroughly with the resin, typical rations being about 2-6:100 respectively. The instant resin compositions contemplated by the present invention, when supplied in this manner, can be mixed relatively less thoroughly in a convenient, equal volume, 1:1 ratio. This allows use of such convenient application systems as a small static mixer fitted to a twin syringe dispenser.
3. The cured repair composites are much "tougher" or resistant to impact than the epoxy or polyester/styrene based materials, because the methacrylate-based compositions on which they are based have superior impact properties.
4. The modified methacrylate compositions adhere to a wider variety of materials, including most thermoplastic and thermoset engineering plastics, unprepared metals, painted metals, and oil or water contaminated surfaces. For example, they will generally fix anything that can be bonded such as steel, aluminum, PVC, ABS, acrylic, blends thereof, polycarbonates, other unprepared metals as well as the oil or water contaminated surfaces. Unfortunately they will not handle those other well known, tough to bond substrates such as polyethylene, polypropylene, fluorocarbon plastics, or vulcanized rubber.

The preferred modified methacrylate compositions for use with the instant invention are described in U.S. Pat. Nos. 3,890,407 and 4,182,644, the teachings of which are included herewith by reference thereto. However, the most preferred compositions are those described in my co-pending application for U.S. Ser. No. 534,918, filed Sept. 22, 1983. Other compositions may be preferred when specific performance features such as chemical or heat-resistance are required.

While many modified methacrylate adhesive compositions can be used as saturating resins for the composites of the instant invention, the most useful are those which combine the advantages of:

1. fast curing;
2. no-mix or simple 1:1 equal volume mix;
3. high impact strength; and
4. good adhesion to a wide variety of materials including unprepared metals, painted metals, plastics and moist or oil contaminated surfaces.

These requirements are generally met by the preferred and most preferred compositions referred to above. The impact strength of the cured adhesive compositions used to saturate the fiberglass substrate contributes directly to the impact strength of the composite repair. The impact strength of the adhesive composite can be measured as described in my aforementioned co-pending application.

It should be noted that certain other modified acrylic compositions may prove to be useful in the instant invention are described in U.S. Pat. Nos. 3,333,025; 3,725,504; 3,970,709 and 4,293,665. These do have a deficiency, however, in that they generally perform best when premixed in hardener to resin ratios of about 2-6:100. Another class of modified methacrylate adhesive which could be used as saturating resins for the instant invention are disclosed in U.S. Pat. No. 4,308,503, the teachings of this patent and those mentioned immediately hereinabove are also incorporated herein by reference thereto.

In general, the impact strength of epoxy-based compositions with relatively rapid cure rates at room temperature is less than 5 ft. lbs. per sq. inch. The impact strength of the polyester/styrene compositions is generally lower than that of the epoxies, i.e. less than 3 ft. lbs. per sq. inch. On the other hand the impact strength of the preferred methacrylate-based compositions as described in U.S. Pat. Nos. 3,890,407 and 4,182,644 fall in the range of from about 8 to about 15 ft. lbs. per sq. inch. Further, the impact strengths of the most preferred compositions as set forth in my co-pending U.S. patent application are from about 12 to about 30 ft. lbs. per sq. inch.

It is generally important that these composites be impact resistant in the temperature range of normally anticipated use, that is, from about −20° F. to about +150° F. However, if particular service conditions are anticipated which require enhancement of a given property such as heat, chemical or moisture resistance, impact strength under normal conditions might be compromised. Specifically, if a high impact strength is required at an operating temperature of +200° F. it is possible that the saturating resin capable of operating in that temperature range will have a reduced impact strength on the order of 5 ft. lbs. per sq. inch at room temperature.

Unless otherwise indicated in the following examples, two types of fiberglass supporting cloth were used. Their physical descriptions are as follows:

|  | Fiberglass Tape | Fiberglass Cloth |
| --- | --- | --- |
| Style | #2964 woven edge | CD8 340 |
| Width | 2 inch (50.8 mm) | Variable |
| Thickness | .012 inch (.30 mm) | .047 inch (1.2 mm) |
| Weave | Plain | Triaxial |
| Weight/sq. yd | 8.5 oz. | 34 oz |
| Count | 17 × 18 | not specified |
| Supplier | Mutual Industries Red Hill, PA. | Nytex Corp. |

TABLE I

| ADHESIVE Ingredients | Weight Percent | ACTIVATOR Ingredients | Weight Percent |
| --- | --- | --- | --- |
| Hypalon ® 48S CSPE[1] | 18.14 | VYNS[5] resin | 4.76 |
| Methyl methacrylate | 57.60 | Methyl ethyl ketone | 71.41 |
| Methacrylic acid | 5.90 | Vanax ® 808[6] | 23.80 |
| Ethylene glycol dimethacrylate | 1.36 | Copper Naphthenate Solution | 0.024 |
| Cumene hydroperoxide | .45 | | |
| Ionol ®[2] | 0.23 | | |
| Milled glass fibers[3] | 13.60 | | |
| Fumed silica[4] | 2.72 | | |

Footnotes:
[1]CSPE = Chlorosulfonated polyethylene
[2]Shell Chemical Company brand of 2, 6-di-t-butyl-4-methylphenol
[3]Grade 731 B/A, 1/32 inch length, Owens-Corning Fiberglass
[4]Cab-O-Sil brand, Grade M-5 Cabot Corp.
[5]Vinyl Chloride/Vinyl Acetate Copolymer, Union Carbide Corp.
[6]Butyraldehyde-Aniline condensation product, R. T. Vanderbilt Company
[7]8 percent copper, Tenneco Chemicals, Inc.

The adhesive resin of Table I was prepared in a 55 gallon steel drum using a ten horsepower "Hockmeyer" high-speed disperser. The total batch weight was 340 lb. (154 kg) with the percentage of each ingredient present in the amount indicated in Table I.

The Hypalon ® 48S chlorosulfonated polyethylene and methyl methacrylate monomer were mixed until all of the "Hypalon ®" was dissolved or dispersed (approximately three hours). The remaining ingredients were added and the mixture stirred for an additional forty-five minutes.

The adhesive activator of Table I was prepared by rolling the ingredients in a glass jar on a jar mill until all components were dissolved.

EXAMPLE I

The adhesive resin of Table I was applied to 3 in (7.5 cm) lengths of the fiberglass tape described above at a coverage rate approximately 0.07 oz. per inch (0.8 gm per cm).

The damaged corner of a fiberglass reinforced polyester tray dimensions of 19 in. length × 12.5 in width × 6 in depth (48.25 cm × 31.75 cm × 15.25 cm) was brushed with a liberal coat of the activator solution of Table I. Three lengths of the resin-impregnated cloth were applied in an overlapping fashion and successively brushed with activator solution such that the damaged area was completely covered.

The patched area was tack-free within ten minutes and then hardened rapidly with the evolution of heat during the next five minutes. After 30 minutes the repaired area was impacted repeatedly with a 12 oz. (340 gram) hammer. The hardened patch was substantially undamaged, while the fiberglas tray fractured in the area surrounding the patch.

EXAMPLE II

Thirty-six inches (91 cm) of fiberglass tape was aligned lengthwise and centered upon a 40 in. (102 cm) length of 0.004 in (0.1 mm) thick polyethylene film. The adhesive solution of Table I was poured along the center of the entire length of the fiberglass tape and spread evenly to cover the tape completely. The tape was inverted on the polyethylene film and the coating process repeated. The average weight of resin per unit length of tape was 0.67 oz/in (0.75 gm/cm).

The ends of the polyethylene film were folded over the ends of the coated fiberglass tape. Similarly, the protruding edges of the polyethylene film were folded toward the center of the fiberglass tape along its entire length to completely enclose it. The protected tape was then rolled up with the folded seam inside and placed in a four ounce wide-mouth jar for storage and later use.

The tape described above and the adhesive activator of Table I were used to make a simulated repair on a four inch (10.2 cm) length of 0.75 inch (1.90 cm) Schedule 80 polyvinyl chloride (PVC) pipe. The pipe section was threaded on each end so that fittings could be applied to enable hydrostatic burst testing of the repaired pipe section.

Two holes 0.125 in (3.18 mm) in diameter were drilled near the center of a pipe section 180° apart on the circumference of the pipe. The pipe was then lightly sanded and wiped clean with methyl ethyl ketone, in the area of the repair. The pipe was then coated with the activator solution of Table I over a sufficient area to totally contact and activate the adhesive resin on the bandage. The activator was applied from a one ounce narrow-mouth laboratory bottle fitted with a small pneumatic pump spraying device.

A 3 inch (7.6 cm) length of the coated fiberglass tape described above wrapped circumferentially about the pipe, centered over the two holes. Before overlapping the first layer of the tape, the outside of the applied tape was sprayed with activator solution. The remaining tape was wrapped around the pipe and the entire repair was sprayed again with activator solution. The completed repair was such that one hole was covered with one layer of tape, the second with two.

The repair was tack-free in about ten minutes and hard to the touch in fifteen minutes. The repaired pipe was allowed to stand for twenty-four hours at 70° F. (22° C.) before testing.

The burst tests were performed by fitting one end of the repaired pipe section with a threaded cap of corresponding size and schedule. The other end was attached via a metal fitting to a hydraulic ram pump fitted with a pressure indicating dial gauge. The pipe section and hydraulic system of the pump were filled with hydraulic oil and all air was bled from the system prior to the burst test. All fittings were then secured, and the pump was activated to increase the ram pressure until failure was indicated by oil leakage and a drop in the indicated ram pressure. This test is an adaptation of ASTM method 1599-69.

When pressure tested according to the above described method, the repaired area began to leak from the area of the hole with a single overlap of tape at an indicated dial pressure of 2500 lb/sq in (176 Kg/sq cm). An unperforated control test pipe failed by fracture at an indicated dial pressure of 2600 lb/sq in (18.3 Kg/sq cm).

EXAMPLE III

Example II was repeated, except that 0.75 in (1.9 cm) black iron pipe was used in place of PVC pipe.

The pipe was prepared by wiping it with methyl ethyl ketone, sanding it with 60 grit sandpaper, and wiping with methyl ethyl ketone again. The repair was done as in Example II.

When pressure was applied, the repaired area started to leak at an indicated dial pressure of 900 lb/in (6.3 Kg/cm).

EXAMPLE IIIA

Example III was repeated except that a longer piece of fiberglass was used to go around the pipe 2.5 times covering each hole with two layers.

When pressure was applied, the repaired area did not start to leak until the indicated dial pressure of 2600 lb/in (18 Kg/cm).

TABLE II

| ADHESIVE Ingredients | Weight Percentage | ACTIVATOR Ingredients | Weight Percentage |
|---|---|---|---|
| 40% Hypalon ® 30 in MM[1] monomer | 44.40 | VYNS[3] resin | 4.76 |
|  |  | Methyl ethyl ketone | 71.34 |
| 25% Acryloid KM-452 in MMA[1] monomer | 44.40 | Vanax ® 808[4] | 23.78 |
| Methacrylic Acid | 8.87 | Copper Napthenate Solution[5] | 0.12 |
| Ethylene glycol dimethacrylate | 1.77 |  |  |
| Cumene hydroperoxide | .44 |  |  |
| Ionol ®[2] | .22 |  |  |

Footnotes:
[1]MMA = methyl methacrylate
[2]Shell Chemical Company brand of 2, 6-di-t-butyl-4-methylphenol
[3]Vinyl Chlorid-vinyl acetate copolymer, Union Carbide
[4]Butyraldehyde-aniline condensation product, R. T. Vanderbilt Company
[5]Eight percent copper, Tenneco Chemicals, Inc.
The adhesive solution of Table II was prepared from separate masterbatches of Hypalon ® 30 chlorosulfonated polyethylene and Acryloid ® KM-452 methacrylate-acrylonitrile-butadiene-styrene (MABS) resin in methyl methacrylate monomer. The masterbatch of Hypalon ® was prepared by rolling the polymer and monomer in a glass jar on a jar mill until the polymer was completely dispersed or dissolved in the monomer. The KM-452 solution masterbatch was prepared by mixing the polymer and monomer in a four quart (3.8 liter) laboratory "Hobart" mixer for 90 minutes.
The masterbatches were combined in the indicated proportions with the remaining ingredients and mixed thoroughly by hand until uniform.
The adhesive activator of Table II was prepared according to the method of Table I.

EXAMPLE IV

A 10 inch×10 inch (25.4 cm×25.4 cm) square of the triaxial cloth described above was placed on one or more sheets of aluminum foil of sufficient area to completely wrap or seal the cloth to prevent the monomers in the adhesive resin from evaporating and to permit its use at a later stage. The adhesive resin of Table II was spread evenly over both sides of the fiberglass cloth as described in Example II, except that the coverage rate was increased to 0.63 oz/sq in (0.3 gm/sq cm) to saturate the thicker cloth. The aluminum foil was folded over the coated cloth and the package was allowed to stand overnight at 70° C. to allow the adhesive resin to fully impregnate the interstices of the cloth.

A 16 in×16 in×0.062 in (381 mm×381 mm×1.57 mm) sheet of aluminum with a three inch (7.62 cm) hole in the center was used to demonstrate the repair of damaged sheet metal structures. The repair was made as described below without cleaning or abrading the surface of the aluminum.

The aluminum foil package was placed on a table with the folded seams upward and then opened to expose the resin-impregnated patch. The entire surface of the patch was sprayed with a liberal coat of the activator solution of Table II, using the device described in Example II. With the aluminum foil still in place, the activated side of the patch was placed over and centered about the hole in the aluminum sheet and smoothed over the surrounding metal. The aluminum foil was then peeled from the patch and adhesive on the patch was smoothed with a wooden stick, paying particular attention at the edges. The entire patch was then sprayed with activator solution. The patch was tack-free in five minutes. The area of the patch over the hole (with no metal contacting to remove the heat of chemical reaction) hardened with the evolution of considerable heat within five to eight minutes. The area of the patch in contact with the metal hardened in 9–12 minutes with less evidence of heat of chemical reaction due to the dissipating effect of the metal.

Fifteen minutes after the application was completed, the center of the patch was impacted repeatedly with a 12 oz. (340 gm) ball-peen hammer without cracking or otherwise damaging the patch. Similar impacting of the surrounding aluminum caused significant dimpling and distortion of the panel, indicating that the repair patch had significantly more resistance to structural damage by impact than the panel itself.

EXAMPLE V

A 3.5 in×4 in×0.010 in (88.9 mm×101.6 mm×0.25 mm) piece of Kevlar®[1], aramid fiber cloth (17×17 count) was coated with 10 g of the adhesive solution of Table II in the manner used in the above examples. The coated patch was sprayed with the activator solution of Table II and placed on an intact sheet of aluminum similar to that of Example IV. The patch was then sprayed with activator. The patch was tackfree within five minutes and hard to the touch in ten minutes.
[1.] Registered trademark of E. I. du Pont.

EXAMPLE VI

Example VI was repeated using a similar size piece of (13×13 count) graphite fiber cloth. The patch was tack-free in six minutes and hard to the touch in 15 minutes.

EXAMPLES VII–IX

In the following examples, commercially available methacrylate-based adhesives were used to impregnate three inch lengths of fiberglass tape. The coated patches of tape were activated and applied to aluminum sheets in the manner of examples V and VI, with the results noted below:

| Example | Adhesive | Activator | Tack-Free Time (min.) | Hardening Time (min.) |
|---|---|---|---|---|
| VII | "Dymax" 828 | "Dymax" 530 | 4.5 | 5–10 |
| VIII | "Dymax" 828 | Table II | 3–4 | 4–6 |
| IX | "Versilok" 201 | "Versilok" No. 4 | 8–9 | 120 |

Footnotes:
"Dymax" is a trademark of the American Chemical and Engineering Company.
2. Contains aldehyde-amine reaction product.
3. Diluted with two volumes of methyl ethyl ketone to facilitate application.
4. Versilok is a trademark of the Chemical Products Division of the Lord Corporation.

EXAMPLE X

Into a cup were placed 30 g of adhesive and 30 g of activator from Table III. These were mixed by hand for ten seconds and half was applied to one side of seven inch (17.8 cm) by seven inch (17.8 cm) piece of fiberglass cloth. The cloth was placed over a three inch (7.6 cm) by one inch (2.5 cm) hole on a piece of uncleaned 16 in (40.6 cm) by 16 in (40.6 cm) by 0.062 in (0.16 cm) sheet of aluminum. The other half of the mixture was applied to the other side of the cloth. This process took 1.5 minutes.

After an additional three minutes, the repair was tack free and warm. After an additional 3.5 minutes, the repair was hard. After another two minutes, the patch was hit repeatedly with a 12 ounce (340 g) ball-peen hammer without cracking or otherwise damaging the patch.

TABLE III

| ADHESIVE Ingredients | Weight Percent | ACTIVATOR Ingredients | Weight Percent |
|---|---|---|---|
| 40% Hypalon ® 30 in MMA[1] Monomer | 89.68 | 25% Acryloid KM-452 in MMA[1] | 90.908 |
| Methacrylic Acid | 8.97 | Vanax ® 808[3] | 9.091 |
| Cumene Hydroperoxide | .90 | Copper Naphthenate Solution[4] | .001 |
| Ionol ®[2] | .45 | | |

Footnotes:
[1]MMA = methyl methacrylate
[2]Shell Chemical Company brand of 2,6-di-butyl-4-methyl phenol.
[3]Butyraldehyde-aniline condensation product
[4]Eight percent copper, Tenneco Chemicals, Inc.
The adhesive solution of Table III was prepared as in Example IV.
The activator of Table III was made by hand mixing a masterbatch of Acryloid ® KM-452 in methyl methacrylate as described in Table II with Vanax ® 808 and copper naphthenate.

EXAMPLE XI

Starting with a square of triaxial fiberglass cloth of either a 12 inch square or a 9 inch square having a Reemay ®[1] layer or veil face is placed face down within a square package of foil. The resin from Table II is applied in a uniform film thickness over the entire top surface. The acrylic adhesive was calendered onto the surface with a suitable straight-edge or blade. After the resin had been applied it was transferred to the piece of heat sealable aluminum foil packaging material keeping the dry Reemay ®[1] side down. The package was then closed with a second piece of foil sheet with a slight pressure being applied over the top piece of foil to alleviate air pockets. Heat sealing of the foil was accomplished with well known heat sealing equipment.
[1.] Reemay ® is a trademark of du Pont for its spunbonded polyester cloth.

This sealed patch was brought to the situs of a damaged aluminum shipping container. Grease, grime and loose dirt in the patching area were briefly wiped away. The sealed foil package was opened and one side of the patch area was sprayed with the activator from Table II. The impregnated patch pressed into place with the back of the foil package. Moderate pressure was applied to the patch with a wooden roller. The top of the patch was sprayed with the activator from Table II. The patch was tack free within 5 minutes and totally hard within 15 minutes.

EXAMPLE XII

The procedure set forth in Example XI was followed with the same materials, however, within 30 seconds of the final spray appliction of activator catalyst on the exterior surface a laminent was aplied, i.e. a thin sheet of maleable aluminum in order to provide additional cosmetic effect to the exterior of the aluminum container on which the patch was placed. The thickness of this aluminum sheet was on the order of 0.0025 inches to 0.0050 inches.

The preferred patch for use with large shipping containers, be they of fiberglass or metal skin construction, is of the triaxial fiberglass fabric impregnated with the resin. This triaxial fabric maximizes puncture and impact resistance.

The compositions set forth offer the advantages that they are usable at room temperature, no heat being required either for applying the compositions to the substrates or curing. They can be used on porous surfaces and those having bonds containing elastomeric polymers such as chlorosulfonated polyethylene are flexible. The instant compositions do not require a careful surface preparation but can be used for example on bonderized or oily steel, aluminum, other metals, polar polymeric materials (i.e., those having various functional groups, e.g. polyesters, polyamides, polyurethanes, polyvinyl chloride, etc.), wood, pre-painted surfaces, glass and paper.

While the invention has been illustrated by certain examples of preferred and greatly preferred embodiments thereof, all parts, proportions and percentages have been by weight unless otherwise indicated. Other than those patents which have been referred to in the background of the invention, all other patents are included herein by reference thereto.

In the following composition claims, the term "consisting essentially of" means that, in addition to the recited components, the composition may also contain other components that do not adversely affect the operability of the composition for its intended purpose.

I claim:

1. An improved laminate patch for closing an opening of a predetermined size in a structure whose integrity has been violated including a substrate being of a size greater than said predetermined opening size, a fast curing acrylic based achesive composition consisting of: an ester monomer wherein said monomer is an acrylate ester monomer or a methacrylate ester monomer; a catalyst; and respective effective amounts of a mixture of (1) chlorinated polyethylene polymer resin and sulfonyl chloride or (2) chlorosulfonated polyethylene polymer resin and (3) a graft copolymer resin for providing said composition with enhanced overall adhesive physical properties, said graft co-polymer resin having a backbone polymer with a glass transition temperature substantially below ambient temperature and a grafted polymer resin having a glass transition temperature substantially above ambient temperature, with ambient being defined as the environment range within which the adhesive is being used and having an impact strength falling in the range of from 6 to 30 ft. lbs./in. 2, said adhesive covering a substantial portion of said substrate and particularly the portion thereof overlying said structure.

2. An improved laminate patch of the type claimed in claim 1 wherein said substrate includes a thin metallic fiber strand panel conforming to the structure to be repaired.

3. An improved laminate patch of the type claimed in claim 1 wherein said substrate is an aramid fiber.

4. An improved laminate patch of the type claimed in claim 1 wherein said substrate is a graphite cloth.

5. An improved laminate patch of the type claimed in claim 1 wherein said substrate is formed of fiberglass.

6. An improved laminate patch of the type claimed in claim 5 wherein said fiberglass includes fibers in the form of a fabric.

7. An improved laminate patch of the type claimed in claim 6 wherein said fiberglass fibers are in multiple layers each of which has the fibers therein individually aligned in parallel relation and there are at least three layers with said triaxially aligned fabric maximizing and supplementing the puncture and impact resistance of said patch.

8. An improved laminate patch of the type claimed in claim 7 wherein one layer of said aligned fiberglass fibers is covered by a spunbond polyester cloth and saturated with said adhesive to give a smooth surface to said patch.

9. An improved laminate patch of the type claimed in claim 1 wherein said adhesive composition consists essentially of: (1) a solution having a Brookfield viscosity of up to about 1 million, including (2) a sulfur-bearing composition selected from chlorosulfonated polyethylene and a mixture of sulfonyl chloride with chlorinated polyethylene in at least one polymerizable vinyl monomer and (3) an accelerator; said sulfur-bearing composition containing about 25–70 wt. percent of chlorine and about 3–160 moles sulfonyl chloride moiety per 100 g. of polymer and being made from polyethylene having a melt index of about 4–500.

10. An improved laminate patch of the type claimed in claim 9 wherein said vinyl monomer is an acrylic monomer, where the sulfur-bearing composition is chlorosulfonated polyethylene and the relative weight proportions of chlorosulfonated polyethylene and the monomer are 100: 25-1000, respectively, and wherein the accelerator is a primary aminealdehyde condensation product.

11. A method of filling a discontinuity in a workpiece surface including preparing a substrate to conform to said workpiece surface and of adequate size to cover said discontinuity, applying a fast ambient curing acrylic based adhesive composition and an activator/accelerator, said adhesive having an impact strength falling in the range of from 6 to 30 ft. lbs./in., said adhesive further being applied to a substantial portion of said substrate and particularly the portion thereof overlying said workpiece surface.

12. The method set forth in claim 11 wherein said adhesive composition consists of: a methacrylate-based ester monomer selected from the group consisting of methyl methacrylate, ethyl methacrylate, butyl methacrylate, cyclohexyl methacrylate, 2-ethylhexyl methacrylate and tetrahydrofurfuryl methacrylate; a methacrylic acid monomer; a catalyst activator selected from the group consisting of aldehyde-amine condensation products, propane fulfonyl chloride and para-toluene sulfonyl chloride; a free-radical generating catalyst selected from the group consisting of organic peroxide, organic hydroperoxide, perester and peracid; and respective effective amounts of a mixture of (1) a chlorinated polyethylene polymer resin and sulfonyl chloride or (2) chlorosulfonated polyethylene polymer resin and (3) a graft co-polymer resin selected from the group consisting of ABS, MSB, MABS, ASA, all-acrylica, SA EPDDM and MAS for providing said composition with enhanced overall compression shear strength, lap shear strength, peel strength and impact strength, and graft co-polymer resin having a backbone polymer with a glass transition temperature substantially below ambient temperature and a grafted polymer resin having a glass transition temperature substantially above ambient temperature, with ambient being defined as the environment range within which the adhesive ia being used.

13. The method as set forth in claim 11 or 12 wherein said activator/accelerator is applied to one surface of said adhesive impregnated substrate, said one surface of substrate then being brought into contact with the damaged workpiece surface and then activator/accelerator applied to entire opposite exposed surface of said substrate to activate said adhesive.

14. The method set forth in claim 11 wherein said adhesive is calendared into a porous flexible sustrate.

15. The method set forth in claim 11 wherein said flexible substrate is chosen from the group consisting of artificial organic fibers compatible to acrylic based adhesives, graphite fiber cloth, fiberglass, steel, aluminum and/or painted metals.

16. The method set forth in claim 11 wherein said activator/accelerator is mixed with said adhesive immediately prior to its application to said substrate and said workpiece surface.

17. The method set forth in claim 11 wherein said adhesive is applied to said substrate which is then sealed in a sealed foil package until just prior to its use on said workpiece thereby preserving said adhesive in a liquid state until utilized and said activator/accelerator being separately packaged for application at the time of use.

18. The method set forth in claim 11 wherein said activator/accelerator is applied to the edges of said workpiece surface, said substrate carrying said adhesive then being applied thereto and the activator applied to the entire exposed surface of said substrate to activate said adhesive.

19. The method set forth in claim 18 wherein said activator/accelerator is sprayed on.

* * * * *